L. S. SKELTON.
ELECTRICALLY HEATED BAIT FOR GLASS DRAWING APPARATUS.
APPLICATION FILED JUNE 26, 1917.
1,326,296.
Patented Dec. 30, 1919.
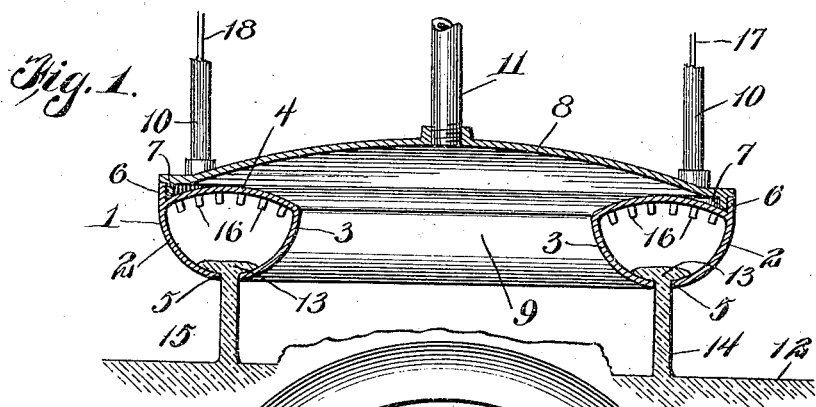
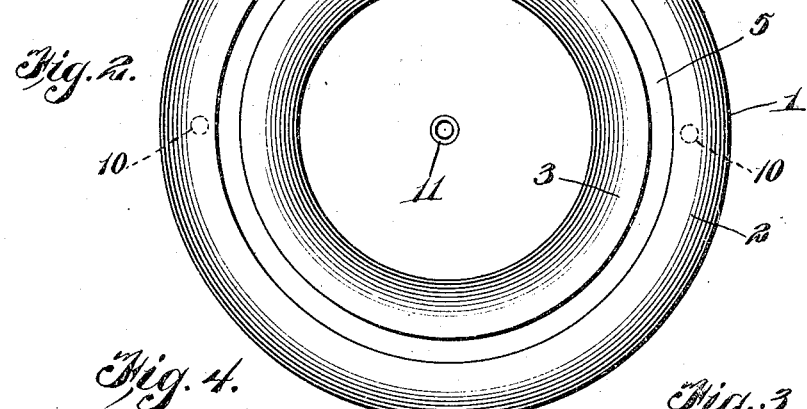
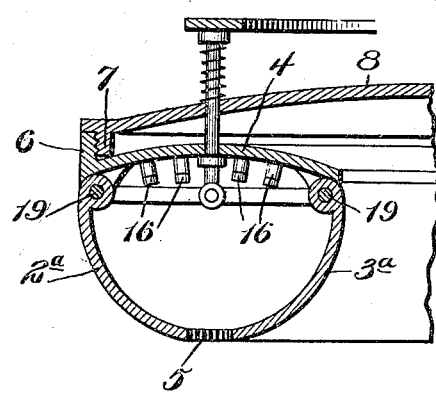 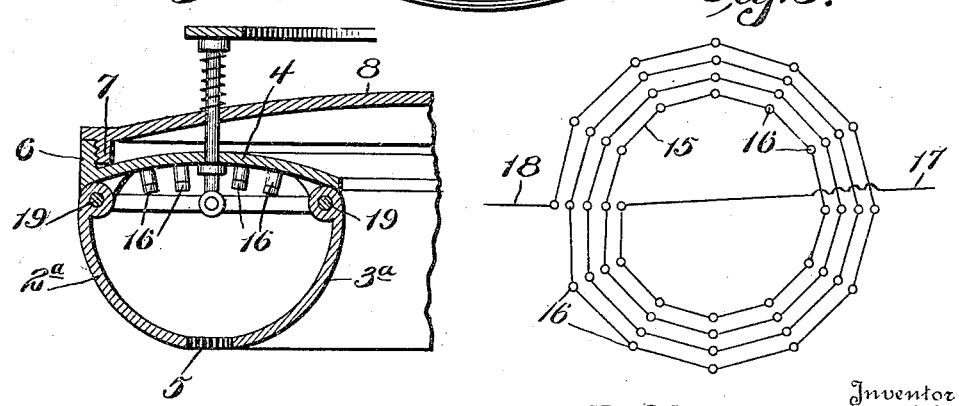
Inventor
L. Sherman Skelton
By C. C. Hines,
Attorney

UNITED STATES PATENT OFFICE.

LEVI SHERMAN SKELTON, OF OKMULGEE, OKLAHOMA.

ELECTRICALLY-HEATED BAIT FOR GLASS-DRAWING APPARATUS.

1,326,296. Specification of Letters Patent. Patented Dec. 30, 1919.

Application filed June 26, 1917. Serial No. 176,973.

*To all whom it may concern:*

Be it known that I, LEVI SHERMAN SKELTON, a citizen of the United States, residing at Okmulgee, in the county of Okmulgee and State of Oklahoma, have invented new and useful Improvements in Electrically-Heated Bait for Glass-Drawing Apparatus, of which the following is a specification.

This invention relates to improvements in drawing tools for glass drawing apparatus, and particularly to a novel construction of bait and means for heating the same.

In the operation of drawing glass cylinders for the production of window glass, it is the common practice to employ a blow tube provided with an enlargement or bait which is dipped into the molten glass and to which the glass adheres to form a neck, after which the glass is blown out to the full diameter of the cylinder to be formed to produce a cap. Owing to imperfect formation or breaking of the neck, due to variations of temperature between the bait and outside atmosphere, and between the inner and outer surfaces of the cap, a good many defective draws are made, resulting in loss of time, waste of material and other losses. Frequently the glass does not properly adhere to the bait and rolls out thereof or breaks away therefrom, causing the loss of the draw. Imperfect neck or cap formation is also frequently due to the premature turning on of the air pressure before the glass is sufficiently chilled or solidified, resulting in the blowing off of the neck. Considerable skill on the part of the operator is also required, in order to secure good working results, owing to the fact that proper judgment must be exercised to keep the bait submerged for a greater or less period, dependent upon the temperature of the glass, and, therefore, imperfect results are often obtained through lack of care, skill or judgment on the part of the operator. Premature chilling of the neck is also frequently the result of the walls of the bait being reduced to an improperly low temperature, as a result of the top or upper portion of the bait being always exposed to the cooling effect of the atmosphere.

The primary object of my invention is to provide a bait which obviates these objections, and by means of which a cylinder of full diameter may be drawn from the outset, without the necessity of forming a cap, thus materially reducing or preventing the losses due to lack of skill or judgment on the part of the operator in the customary practice of expanding the neck to form a cap of the full diameter of the cylinder.

A further object of the invention is to provide a novel form and construction of bait whereby the glass may be gathered and held in an effective manner to form the neck, without liability of the glass rolling out of the bait or breaking away therefrom.

A still further object of the invention is to provide novel means for heating the upper portion of the bait to equalize the temperature therein and to maintain a proper working temperature at all times.

With these and other objects in view, the invention consists of the features of construction, combination and arrangement of parts hereinafter fully described and claimed, reference being had to the accompanying drawings, in which—

Figure 1 is a vertical transverse section through a bait constructed in accordance with my invention;

Fig. 2 is a bottom plan view of the same;

Fig. 3 is a diagrammatic view showing the arrangement of the electrical resistance wires; and Fig. 4 is a sectional view through one side of the bait, showing a modified form of construction.

Referring to the drawing, 1 designates the bait, comprising an annular or ring-shaped body of channeled form in cross section, said body consisting of outer and inner curved walls 2 and 3 and an arched or dome-shaped top wall 4, the walls 2 and 3 being divided at the base of the bait and having their edges spaced to form a gathering slot or opening 5. The top wall 4 is provided with an upwardly-extending internally threaded flange 6 receiving an externally threaded flange 7 upon a head or main cover plate 8, which overhangs and covers the central opening or passage 9 produced by the annular form of the bait.

Hollow suspending rods or tubes 10 are provided for connecting the bait with and supporting it from the draw carriage, whereby in the operation of the drawing tool the bait is adapted to be lowered into the bath of molten glass and thereafter raised for the production of the glass cylinder. At its center the head or cover 8 is formed with a threaded opening to receive the lower threaded end of an air supply or blow pipe 11 through which air is supplied for passage through the opening 9 to the interior of the cylinder, while said cylinder is being drawn.

In the operation of the device, the bait is lowered until the channeled body thereof is partially submerged in the body of glass 12 within the glass reservoir, whereby the glass is caused to flow upwardly through the slot 5 into the lower portion of the channel of the bait, such portion of glass being chilled by contact with the inner surfaces of the walls 2 and 3 and forming a neck 13 whereby the cylinder 14 is drawn and through the medium of which the cylinder is connected with the bait in the drawing action. The annular slot 5 is of a diameter corresponding to the full diameter of the cylinder which is to be drawn, and consequently in the production of the cylinder, after the formation of the neck, the carriage is simply raised on its upward travel to draw a cylinder of the full diameter without the usual practice of first forming a narrow neck and thereafter expanding the glass to form a cap of the full diameter of the cylinder. The slot 5 is made of sufficient width to gather enough glass to form a neck of some considerable body or thickness, and to insure the passage into the bait of sufficient glass to insure the chilling of enough glass by contact with the surfaces of the walls 2 and 3 to make an absolutely certain connection, irrespective of any variations at different times in the fluidity of the glass due to variations of temperature. As a result, while a portion of the molten glass may run out of the channel of the bait, sufficient will remain to form the neck or connection, and wall surfaces of adequate area are presented to chill the glass to a sufficient degree to insure its retention against any possibility of the retained glass pulling out or breaking away when the draw begins. The advantages gained are, accordingly, that a cylinder of full diameter is drawn from the outset without the necessity of the operator exercising any particular care or skill in forming the neck or connection, and without the necessity of the operator expanding the glass to produce a cap in the customary way. Hence a perfect draw is practically insured at each operation, and a bait which is to such extent practically automatic in operation produced. In the drawing of the cylinder it will, of course, be understood that as the draw progresses air is admitted to the interior of the cylinder through the pipe 11 and opening 9, for the purpose of chilling the interior of the cylinder and making the interior and exterior pressures uniform, but as the cylinder is drawn of full diameter from the start and an air admission opening of considerable size is produced, the necessity of graduating or regulating the amount of air supplied to the cylinder in order to maintain its diameter is obviated. As a result, pulsations, irregularities of pressure and other variations due to imperfect manipulation of the air controlled by the operator or to variations between the external and internal diameters, are entirely prevented or materially reduced, so that a larger proportion of perfect draws may be made.

In order to prevent undue chilling of the walls of the bait, and to keep the internal temperature thereof substantially uniform, I provide heating means of novel construction and arrangement within the bait. As shown in the present instance, this heating means consists of an annular coil of resistance wire 15, preferably disposed within the upper portion of the bait and extending around the same upon the under side of the top wall 4, the convolutions of the coil being arranged concentric with the axis of the bait and said convolutions being connected at spaced intervals with radially-arranged rows of insulators 16 carried by the top wall 4 and maintaining the wire convolutions in spaced relation to each other and to said wall. One terminal of the coil is at the end of the inner convolution thereof, and this terminal is connected with a conducting wire 17, while the other terminal of the coil is at the end of the outer convolution and is connected with a conducting wire 18, said conducting wires extending diametrically in opposite directions and passing upwardly through the tubular suspension devices 10. One of the conductors serves as a feed wire connected with a source of current supply, and the other as a return wire, whereby current may be supplied to the coil to heat the convolutions thereof to the desired degree, whereby the upper portion of the bait will be maintained at a desired temperature. The electrical heater so constructed heats the walls 2 and 3 and thus maintains the same at such a temperature as to prevent the glass from chilling too quickly. Thus provision is made for keeping the bait at a sufficiently low temperature to effect the chilling of the glass in the formation of the neck, while at the same time preventing the bait from becoming unduly chilled and causing premature hardening, as well as an undue degree of hardening, of the glass.

In Fig. 4 I have shown the heating means applied for use in connection with a bait in which the walls 2ª and 3ª are hingedly connected, as at 19, with the top wall 4, so as to permit said walls to have movement toward and from one another to vary the size of the slot or opening 5. The construction in this respect may accord with that disclosed in my copending application No. 176,972, filed June 26, 1917, wherein the movable walls 2ª and 3ª are sectional or in the form of segments automatically connected for relative opening and closing movements, whereby on the downward movement of the bait the walls will be opened or spread apart to provide an opening 5 of maximum area to admit the glass, and then upon the upward movement of the bait the walls will be closed to contract the slot or opening and gather the glass in an effective manner. It is to be understood, of course, that the heating means may be applied to the form of bait shown in Figs. 1 and 2, wherein the walls are relatively rigid, or to such a structure as that shown in Fig. 4, or to any equivalent form or construction of bait.

I claim as my invention:

1. A bait for glass drawing apparatus comprising a hollow annular body including side walls forming a glass receiving chamber having a bottom admission slot, and heating means directly inclosed within the upper portion of said glass receiving chamber.

2. A bait for glass drawing apparatus comprising a hollow annular body including spaced inner and outer walls forming a glass receiving chamber and a bottom admission slot, and electrical heating means directly inclosed within the upper portion of said glass receiving chamber.

3. A bait for glass drawing apparatus including an annular or ring-shaped body having spaced inner and outer walls forming a glass receiving chamber and a glass slot or opening in the bottom thereof, and electrical heating means in the top portion of said chamber between the walls of said hollow body.

4. A bait for glass drawing apparatus comprising an annular or ring-shaped hollow body of channeled form in cross section, said body having a glass admission slot or opening in the bottom thereof, a resistance coil contained in the top of the body and composed of convolutions extending around the body concentric with the axis thereof, and conductors connected with the terminals of said resistance coil.

5. A bait for glass drawing apparatus including a hollow body having spaced walls forming a glass receiving chamber and a glass inlet at the bottom thereof, an electrical resistance coil within the top of said glass receiving chamber, tubular suspending members connected with the bait, and conductors connected with the terminals of the coil and extending through said tubular suspending members.

6. A bait for glass drawing apparatus comprising a hollow annular body having spaced inner and outer walls forming a glass receiving chamber and a glass admission slot at the bottom thereof, a top wall connecting the upper edges of said outer and inner walls, and an electrical resistance coil supported by said top wall and disposed directly within the upper portion of the glass receiving chamber.

7. A bait for glass drawing apparatus comprising a hollow annular body including inner and outer ring-shaped walls, said walls forming a glass receiving chamber and having their lower edges spaced to form an inlet slot leading thereto, a top wall connecting the upper edges of said outer and inner walls, insulators arranged in radial rows upon the underside of said top wall, and an electrical heating coil extending around the underside of said top wall and having its convolutions arranged in concentric relation and connected with said insulators.

8. A bait for glass drawing apparatus comprising a hollow annular body having spaced inner and outer walls forming a glass receiving chamber and a glass admission slot at the bottom thereof, a top wall connecting the said inner and outer walls, and an electric resistance coil supported by said top wall.

9. In bait for glass drawing apparatus, a body comprising a chamber to receive molten glass and including spaced side walls, a top wall for said body, and an electric heating coil supported by said top wall and having its convolutions arranged concentrically with respect to the vertical axis of the body.

10. A bait for glass drawing apparatus comprising a body including spaced side walls adapted to contain molten glass, a top wall therefor, a cover for the body secured to a portion of the top wall, and heating means within said body.

In testimony whereof I affix my signature in presence of a witness.

L. SHERMAN SKELTON.

Witness:
BENNETT S. JONES.